United States Patent [19]
Mincuzzi

[11] 3,790,889
[45] Feb. 5, 1974

[54] EDDY CURRENT SPEEDOMETER

[75] Inventor: Antonio Mincuzzi, Milano, Italy

[73] Assignee: Societe Internationale De Mecanique Industrielle S. A., Luxembourg, Luxembourg

[22] Filed: June 19, 1972

[21] Appl. No.: 263,869

[30] Foreign Application Priority Data
June 17, 1971 France .............................. 71.22062

[52] U.S. Cl.................. 324/167, 310/103, 310/156
[51] Int. Cl. .......................................... H02k 49/04
[58] Field of Search ....... 310/93, 98, 103, 105, 112, 310/119, 156, 117, 102, 268; 73/519; 324/167

[56] References Cited
UNITED STATES PATENTS
3,299,353   1/1967   Grant et al.......................... 324/167

*Primary Examiner*—D. F. Duggan
*Attorney, Agent, or Firm*—Maxwell E. Sparrow et al.

[57] ABSTRACT

A counter, for example a counter-speedometer for automobile vehicles, comprising a motion take-off actuating a signal emitter and a receiving unit comprising a rotary magnet which drives, by the effect of Foucault's currents, a non-magnetic movable element integral with an index and subjected to the action of a return spring, a rotating field generator driving in synchronism said rotary magnet and supplied with power by said signal emitter, wherein the rotating field generator is constituted by at least one stator winding having at least one core terminating in pole pieces which encompass therebetween the rotary magnet and the non-magnetic element, said non-magnetic element being a disc rotating coaxially with the rotary magnet which is constituted by at least one elementary magnet oriented axially, and said pole pieces being disposed in such manner that the lines of force therebetween are also parallel to said common axis.

1 Claim, 2 Drawing Figures

EDDY CURRENT SPEEDOMETER

The present invention relates to counters and in particular, but not exclusively, to counter-speedometers used in automobile vehicles.

It is known that counter-speedometers with which most automobile vehicles are at present equipped usually comprise a motion take-off associated with motion transmitting means, usually the output shaft of the gearbox of the vehicle, this motion take-off being connected through a rotary cable within a sheath, known as a flexible shaft, to a receiving unit mounted on the dash-board and comprising, on the one hand, means indicating the distance travelled through (mileage counter) and, on the other hand, means indicating the instantaneous speed (speedometer).

The means indicating the distance travelled through usually consists of a memory having drums driven in a positive manner by the flexible shaft whereas the means indicating the speed comprise a rotary permanent magnet driven in a positive manner by the flexible shaft and exerting, owing to the production of Foucault's currents, a driving torque on a disc of non-magnetic metal which acts as a rotor of an asynchronous motor, is subjected to a return torque and carries an indicator needle which moves with respect to a fixed dial.

In order to reduce the fatigue of the flexible shaft, which is practically impossible to lubricate after assembly, the path it follows is made as direct and as short as possible between the motion take-off and the receiving unit. This can in some cases give rise to disadvantages, in particular when these elements are remote from each other and located in places which require that the flexible shaft extends through a sinuous path.

It has already been proposed to replace the mechanical transmission constituted by the flexible cable or shaft by an electrical transmission which lends itself to the most sinuous and the longest paths. This is achieved by using, on the one hand, at the power take off, a pulse generator whose pulse frequency is a function of the speed of rotation of the means transmitting the motion and, on the other hand, in the receiving unit, means generating a rotating field driven by said pulses acting on the permanent magnet which acts as a rotor of a synchronous motor, its speed of rotation being therefore a function of the frequency of the pulses, that is, the speed of rotation of the means transmitting the motion or, in other words, the speed of the vehicle.

Known devices of this type employ a non-magnetic element consisting of a cup or bell-shaped member whose curved edge portion is subjected to the action of the rotary magnet which induces therein Foucault's currents which produce a torque that rotates the cup until a balance is achieved with the return torque exerted by the spring. The lines of force which pass through the non-magnetic element are perpendicular to its axis of rotation, which is disadvantageous from the point of view of efficiency and space consumption. It would be more desirable to be able to employ, as in known counters having a flexible drive, a disc of metal as the non-magnetic element so as to employ an element similar to those already existing.

An object of the invention is to improve the counters of the foregoing type in such manner that the lines of force passing through the non-magnetic element, which is a disc, are parallel to the axis of rotation of the magnet.

The invention provides a counter, for example a counter-speedometer for automobile vehicles, comprising a motion take-off which actuates a signal emitter and a receiving unit comprising a rotary magnet which drives by the effect of Foucault's currents a non-magnetic movable element which is integral with an index and is subjected to the force of a return spring, a rotating field generator driving said rotary magnet in synchronism and being supplied with power by said signal emitter, wherein the rotating field generator is constituted by at least one stator winding having at least one core which terminates in pole pieces which encompass therebetween the rotary magnet and the non-magnetic element, said non-magnetic element being a disc which rotates coaxially with the rotary magnet which is constituted by at least one elementary magnet oriented axially, and said pole pieces being disposed in such manner that the lines of force therebetween are also parallel to said common axis.

In the accompanying drawing, there has been shown diagrammatically, by way of a non-limitative example, a preferred embodiment of the counter-speedometer according to the invention, the device being assumed to be of the type of utility on automobile vehicles.

Figure 1:
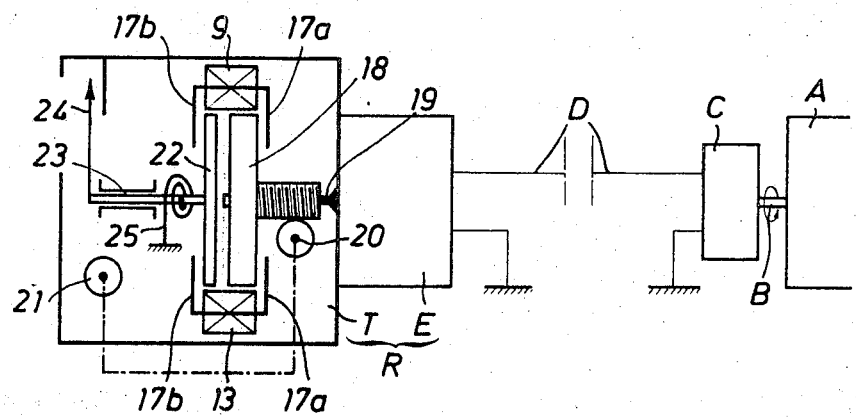
FIG. 1 is a simplified diagram of the assembly of the device.
Figure 2:
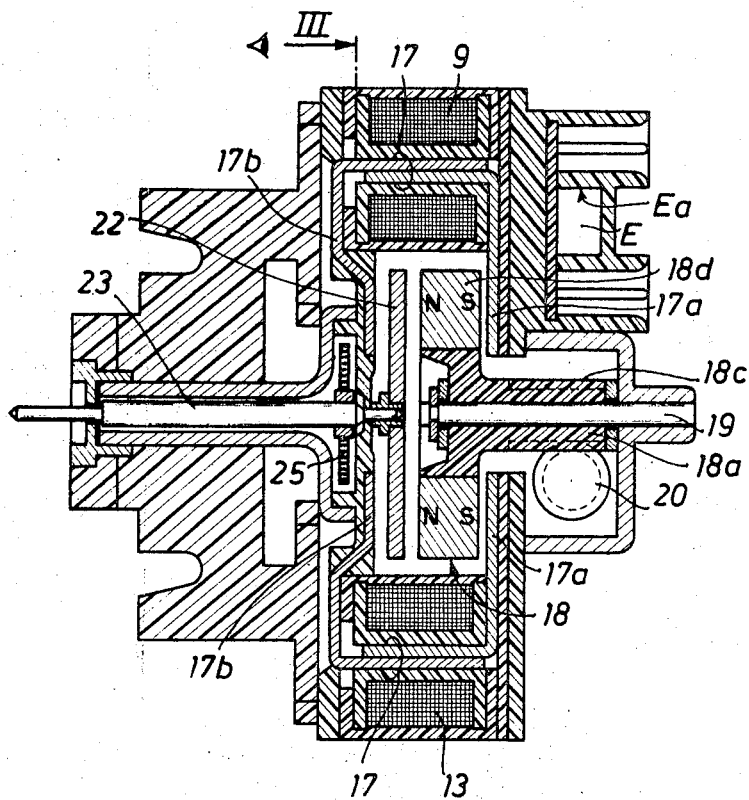
FIG. 2 is an axial sectional view of means for generating a rotating field, the rotary permanent magnet directly driving a counter-adder and the non-magnetic disc subjected to the action of said magnet and a return spring for a disc.

In FIG. 1, A designates a mechanism for transmitting motion, for example a gearbox, with the motion take-off B driving a generator of electrical pulses C, which pulses are transmitted to a receiving unit R by an electrical conductor D. The aforementioned conductor is connected to the input of an electronic device E known per se which imparts to the pulses supplied thereto by the generator C the shape of rectangular pulses.

The generator of the rotating field is constituted by eight windings or coils 9 – 16 each of which comprises a core 17 in two parts terminating in pole pieces 17a, 17b which extend toward the axis of the counter and encompass the moving part of the device.

The moving part of the device comprises a rotary magnet 18 consisting of a hub 18a of plastics material having an axial aperture 18b through which extends a fixed spindle 19 on which is rotatable the whole of the magnet, the periphery of the hub having a screwthread which constitutes a worm 18c which drives speed reducing means 20 connected to the counter-adder 21.

Held tight on the hub 18a is a ring 18d of hard ferrite in the thickness of which are formed four individual N S magnets whose lines of force are parallel to the axis of rotation. The fields produced by the four N S magnets are closed through the armatures or pole pieces 17a, 17b of the windings of the stator.

Disposed in front of the rotary magnet 18 (which rotates in synchronism with the rotating field produced by the stator windings) and coaxially with this rotary magnet is the usual disc 22 of non-magnetic metal keyed on a spindle 23 carrying the indicator needle 24 of the speedometer part of the device, which spindle is subjected to the action of a return spring 25.

It can be seen therefore that, owing to the arrangement according to the invention, the lines of force passing through the disc 22 are parallel to the spindles 19 and 23.

All of the stator means and elements described hereinbefore are maintained in position since they are moulded in a plastics material such as an epoxy resin.

The rotary field and the rotary magnet rotating in synchronism with this field effect in the presently-described embodiment a semi-revolution for each cycle of four pulses emitted by the pulse generator.

What I claim is:

1. A counter responsive to the frequency of a pulsed electrical signal comprising
   a. a rotating magnet, the field of which is substantially parallel to its axis of rotation;
   b. a disc of non-magnetic conductive material mounted for spring-returnable rotation coaxial with but mechanically independent of the rotation of the magnet, said disc being disposed in face-to-face relationship with said magnet so as to be urged into rotation by the Foucault currents of the rotating magnet;
   c. means operable to register rotation of the disc; and
   d. a rotating field generator energized by said electrical signal and having a plurality of uniformly spaced electromagnetic coils, each of said coils having a core the pole positions of which are so disposed that lines of force therein between when said coil is energized
      1. are substantially parallel to the common axis of rotation, and
      2. are intersected by the outer peripheries of the rotating magnet and disc.

* * * * *